United States Patent [19]

Pryor et al.

[11] Patent Number: 4,621,664
[45] Date of Patent: Nov. 11, 1986

[54] FILLING MACHINES

[75] Inventors: Timothy R. Pryor, Tecumseh; Omer L. Hageniers, Windsor, both of Canada

[73] Assignee: Diffracto Ltd., Windsor, Canada

[21] Appl. No.: 657,259

[22] Filed: Oct. 3, 1984

[51] Int. Cl.⁴ .................................................. B65B 1/04
[52] U.S. Cl. ............................................ 141/1; 141/83; 141/129; 141/100; 177/52; 177/103; 177/DIG. 7
[58] Field of Search ......................... 141/83, 1–12, 141/100–110; 177/52, 103, DIG. 6, DIG. 7

[56] References Cited

U.S. PATENT DOCUMENTS 4,407,379 10/1983 Pryor et al. .................. 177/52
4,420,051 12/1983 Furuta et al. .................. 177/52

Primary Examiner—Houston S. Bell, Jr.
Attorney, Agent, or Firm—Larson and Taylor

[57] ABSTRACT

Disclosed are method and apparatus for determining and assuring correct fill weight of containers. In one embodiment electro-optical weigh cells are employed in conjunction with weigh dump receptacles. A second embodiment discloses addition of a second container weighing operation with addition of optional additional fill operations.

20 Claims, 3 Drawing Figures

FILLING MACHINES

BACKGROUND

This invention relates to the subject matter of U.S. Pat. No. 4,407,379 issued Oct. 9, 1983 the disclosure of which is hereby incorporated by reference.

One of the problems of making filling machines, especially for hard to handle substances, is that one cannot be assured when filling any one package that the weight is right. Therefore, it is often needed to add more to it (or remove material), also called "dribble fill". The question is, how to do this at high speed and high accuracy?

One approach has been shown in the above mentioned, U.S. Pat. No. 4,407,379 which allows containers (packages) to be weighed on-the-fly and their fill weight corrected. Disclosed herein is an improvement wherein a combination of weigh/dump cells, according to the invention are transported relative to package carrying cells, which also may be according to the invention, and used to assure that the packages are filled to the correct weight.

This invention contemplates the use of the electro-optical cells of the referenced patent in weigh dump receptacles such as are known in the art. The material is then transfered to the container and additional material added or removed if required.

More than one weigh dump cell can be used to fill any given container. Via the invention, the weigh dump receptacles and/or the containers can be in continuous motion for maximum speed and reliability (a major problem with current weigh dump systems which must generally stop).

A major advantage also results in that the containers themselves can also be weighed in such a system, allowing container tare weight to be accounted for and determining the extent of subsequent weigh receptacle dump or dribble operations to be performed.

Figure 1A:
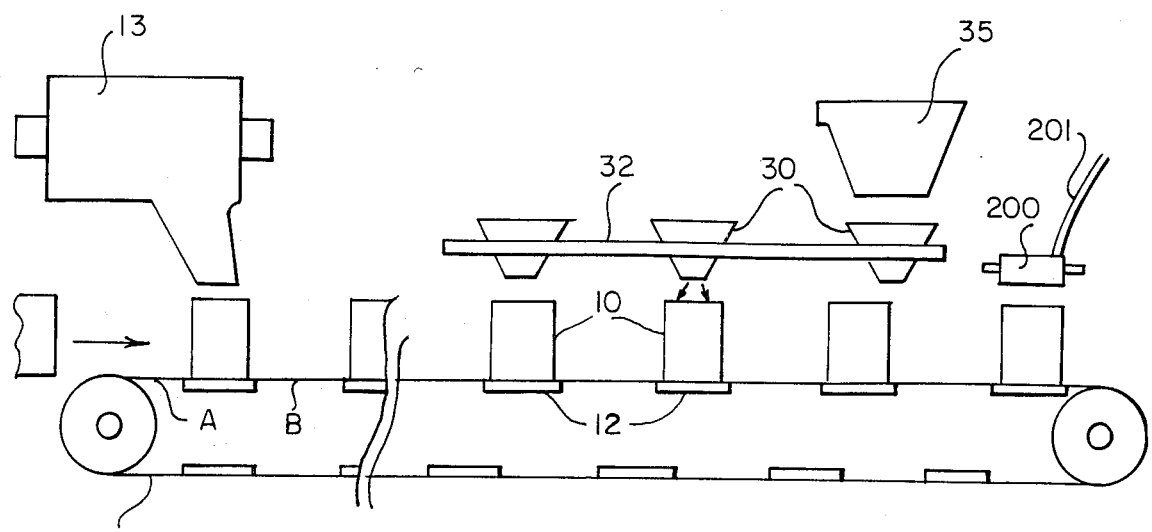
FIG. 1(a) is a highly schematic side elevational view of a filling system in accordance with the invention.
Figure 1B:
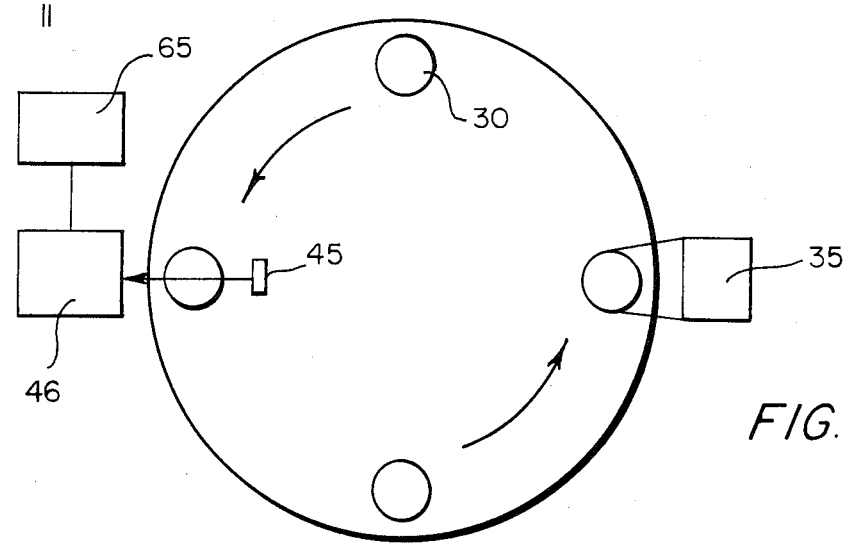
FIG. 1(b) is a plan view of the fill receptacles shown in FIG. 1(a)

Consider FIGS. 1(a) and 1(b). The device shown includes packages 10 traveling along a linear line 11 optimally with weigh cells 12 of the patent. In the referenced invention we showed the filling (for example, by fill dispenser 13) of such packages and bringing them to the correct weight by simply weighing them at at least one point (eg. point "B") after first fill and adding (or subtracting) material wherein the amount added was controlled according to the weight.

In one embodiment of this invention, control of additional amount of material is provided by a second line of weigh receptacles 30 above the first or displaced in some other direction (overhead however is typical for gravity to effect the fill) is utilized. The receptacles are shown here on a rotary disc 32, and may be of the same or different capacities. If they are the same, the process of their filling assures that they will have slightly different amounts in each one. These weigh receptacles contain weigh cells of our referenced invention and are filled at fill station 35 at one end and again weighed as they go around with the weight tracked by computer 65. When the receptacle with the correct additional weight (or the most correct of the given filled receptacles in the disc) is obtained, that receptacle is exhausted into the correct container. Due to the advantageous operation of the invention, all of this can happen in motion, and there is no need to stop.

The moving weigh dump receptacles can move at a considerably higher rate than the containers and therefore overtake them, or they can move in the opposite or other direction to intercept.

The size preferably of the weigh dump receptacles and/or the method of their loading is chosen as to always have a range of weights in those cells which can be used to 'top off' the range of fill weights associated with the main filling operation. For example, random fill weights or computer optimized random weights can be used.

It is noted that just like in the reference patent, the tare weight of the packages can be removed from this weight calculation by loading the unfilled containers on, and at a first point, 'A', measuring them according to the invention. In addition, the containers can be weighed after the dumping of the initial charge and further corrections applied.

This technique is very powerful and can be used for just about anything, including liquids. Particularly it could be used for high speed products such as munitions, beer cans and hard to fill substances like potato chips, corn flakes, etc.

The invention can clearly be built all in an "all rotary", all linear, or any other suitable fashion. Two rotaries, one over the other, can be used for example.

It is noted that the rotary on top has to dump within the short tangential zone of the rotary that allowed for filling when correct container, receptacle is brought in to place. Rotary motion gives a smoother motion allowing higher speeds than the linear. Therefore, the linear moves slowly, the rotary fast.

Figure 2:
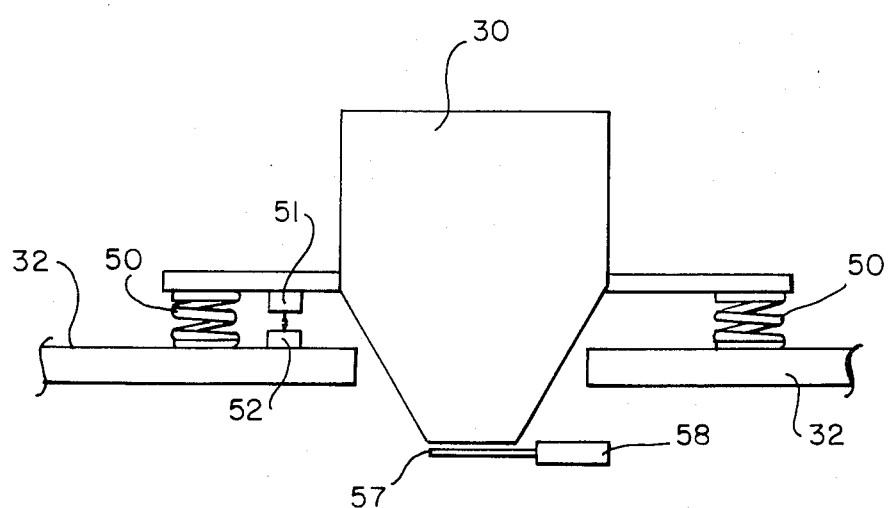
FIG. 2 is a side elevational view of a weigh receptacle in accordance with a preferred embodiment of one invention.

FIG. 2 shows a detail of one type of weigh receptacle according to the invention. The receptacle 30 is mounted to rotating disc 32 by elastic members 50 which deflect in proportion to the weight of material in the receptacle thereby changing width w between edge members 51 and 52. This width w is monitored by an imaging or diffraction based measurement system (such as with laser 45 and photodetector camera 46 in FIGS. 1a and 1b as the receptacle comes around in its motion past a weight measurement point. Alternatively, only edge 51 needs to be monitored if the weigh disc 32 is well known in its location relative to the measurement sensor. However, it is generally best to monitor both reference edge 52 and moving edge 51.

Fill material is held in weigh receptacle 30 in one example by gate 57 actuated by solenoid 58 controlled by computer 65 which causes it to dump at the correct instant (when a container is underneath). Initial width $w_o$ can be first determined when no fill inside and the initial receptacle tare weight determined (and stored in memory for that receptacle). Fill weight is thus proportional to $w_o - w_f$ where $w_f$ is the decreased width when filled.

Another aspect of the invention is that all the filled receptacles do not have to dump—that is they can keep going around until they are used. Interestingly, the same applies to the containers. Since the device is recirculating, particularly the rotary versions, the container (or receptacle) can keep going around until it receives its correct fill. One, however, has to have a mechanism for not loading another empty container onto the same weigh cell where the partly full one is.

Because of the fact that the packages can keep going on and on and still be on the same weigh cells, at only the price of extra weigh cells, one could actually have a plurality of these types of weigh dump conveyors and essentially give the system more than one chance to top off a container so to speak. Other types of dribble fill can also be used.

This idea of containers or receptacles recirculating until they reach a correct fill weight is a new one and potentially of considerable interest.

A computer such as 65 tracks the progression of container (or weigh receptacle) as it recirculates through at least one filling station and/or at least one trim (dribble) station. The weight after each fill is measured at at least one weigh station which also may be used to sense, if desired, the tare weight of the container.

The recirculating system can be built in rotary, linear or any other convenient arrangement. As the container fills, its weight is measured and additional amounts "injected" (dribbled) each pass until full to the desired weight.

The rate (in filled containers per hour, say), is dependent on the rate of correct fill of the previously loaded containers. If too many passes are required on the average to fill a container, the control computer may increase the fill amount(s), primary or dribble, to cause a quicker reaching of correct weight. (but perhaps with less accuracy of that weight).

The rotary fill mechanism where each item is released only when ready, allows highly accurate rates to be generated. While the invention comtemplates a revolving or otherwise recirculating fill means which would deposit for example the same amount of dribble fill each time, it is also possible to have a variable amount put in under control of a command computer. This variable amount could be put in from a variable fill and dump or using flow control means known in the art. No container leaves until it is filled within some certain tolerance span which is adjusted on an ongoing basis to allow the desired throughput rate to be maintained while still satisfying economic goals or governmental restrictions.

The actual means for unloading the rotary weigh cells is via a pusher arm or other suitable device for pushing the containers off which can be actuated on demand.

One could also have a weigh dump conveyor going along with the other conveyor that actually removes material from the package. For example, a vacuum hose sucking corn flakes out of a box would be the reverse of a filling nozzle going down in the box from overhead. In other words, you only suck out just the little bit that's required where you do the main fill by some dump cycle. A shuttle arrangement for dumping or sucking is shown in FIGS. 1a and 1b.

Corn flakes packages such as 10 for example, travel on a continuous layer conveyor 11 with weigh cells according to our previous patent. Overhead shuttle unit 200 moves in conjunction with the line for a limited period of time and sucks out with hose 201 some of the material until the weight becomes correct as measured by the system disclosed in our previous patent.

After the material is removed, the shuttle rapidly traverses back to be ready for the next package.

Relative to FIGS. 1a and 1b, it is noted that alternately the total fill can be provided by the weigh dump receptacles eliminating the need for fill dispensor 13 and weigh check 'B'. In this case, one receptacle can dump the most correct load nearest final fill weight into a container 10, or a plurality of successive dumps by receptacles 30 can be made until the correct weight is attained. A best fit approximation can be used to provide the best approximation of final fill weight from the choices present in the pre weighed filled receptacles 30.

What is claimed is:

1. An improved method of filling containers comprising the steps of,
    loading fill material into at least one of a circulating series of weigh receptacles,
    weighing the material in said weigh receptacles using electro-optical means while said receptacles are in continuous motion, and
    dumping the fill in at least one of said receptacles into at least one container.

2. A method according to claim 1 where both the receptacles and containers are in continuous motion.

3. A method according to claim 1 wherein said dumping step is performed selectively.

4. A method according to claim 3 wherein said dumping step is perfomred to optimize the weight of material in said container.

5. A method according to claim 4 wherein said optimization is performed by choosing the best fit of receptacle fill weight.

6. A method according to claim 1 wherein said container is also weighed electro-optically and the container tare weight is removed from consideration.

7. A method according to claim 1 wherein said container is weighed after said dumping step and checked or material further added or removed.

8. A method according to claim 1 wherein said receptacles and said container move in opposite directions.

9. A method according to claim 1 wherein more than one weigh receptacle is used to fill a given container.

10. A method according to claim 1 wherein said weigh receptacle are purposely filled with different amounts.

11. A method according to claim 10 wherein said weigh receptacles are of different volumes or other dimension.

12. A method according to claim 1 wherein a plurality of receptacle fill lines are used for any one container line.

13. A method according to claim 2 wherein said receptacle is not dumped until used.

14. A method according to claim 1 wherein a previous fill operation provides rough filling of a container which is topped off with fill from at least one of said receptacles.

15. A method according to claim 14 wherein said container is moving in continuous motion and is electro-optically weighed.

16. A method according to claim 4 wherein final container weight is made up of individual receptacle contributions optimally chosen from those in circulation.

17. A method for filling containers comprising weighing the containers while the container are in in continuous motion, filling said containers at at least one fill position, and recirculating each said container past said at least one fill position until a correct fill is determined.

18. In a method for filling containers moving in continuous motion, the improvement comprising using a shuttle mechanism whose movement is synchronized with the motion of the containers to add material to or remove material from said containers while said containers are in motion until a predetermined container fill weight is obtained.

19. A method according to claim 1 wherein receptacles and said container move in the same direction at different rates.

20. A method according to claim 1 wherein said receptacles and said container moves at an oblique angle with respect to one another.

* * * * *